(12) United States Patent
Yasui

(10) Patent No.: US 10,374,435 B2
(45) Date of Patent: Aug. 6, 2019

(54) POWER CONDITIONER

(71) Applicant: Murata Manufacturing Co., Ltd., Nagaokakyo-shi, Kyoto-fu (JP)

(72) Inventor: Hiroyuki Yasui, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 77 days.

(21) Appl. No.: 15/838,912

(22) Filed: Dec. 12, 2017

(65) Prior Publication Data

US 2018/0198284 A1 Jul. 12, 2018

(30) Foreign Application Priority Data

Jan. 6, 2017 (JP) ................. 2017-001189

(51) Int. Cl.
| | |
|---|---|
| *H02J 3/38* | (2006.01) |
| *H02S 40/32* | (2014.01) |
| *H02M 5/40* | (2006.01) |
| *H02J 3/10* | (2006.01) |
| *F24F 5/00* | (2006.01) |
| *H02M 1/32* | (2007.01) |
| *H02M 7/00* | (2006.01) |
| *H02M 1/00* | (2006.01) |

(52) U.S. Cl.
CPC ............. *H02J 3/385* (2013.01); *H02J 3/10* (2013.01); *H02J 3/381* (2013.01); *H02J 3/382* (2013.01); *H02M 5/40* (2013.01); *H02S 40/32* (2014.12); *F24F 2005/0067* (2013.01); *H02M 1/32* (2013.01); *H02M 7/003* (2013.01); *H02M 2001/0009* (2013.01); *Y02E 10/563* (2013.01); *Y02E 10/763* (2013.01)

(58) Field of Classification Search
CPC .... H02J 3/385; H02J 3/10; H02J 3/381; H02J 3/382; H02S 40/32; H02M 5/40; H02M 1/32; H02M 7/003; H02M 2001/0009; F24F 2005/0067
See application file for complete search history.

(56) References Cited

U.S. PATENT DOCUMENTS

2012/0286759 A1 11/2012 Ootani et al.

FOREIGN PATENT DOCUMENTS

| JP | 2015089144 A | 5/2015 |
|---|---|---|
| WO | WO 2011/093109 A1 | 8/2011 |

*Primary Examiner* — Robert L Deberadinis
(74) *Attorney, Agent, or Firm* — Arent Fox LLP

(57) ABSTRACT

A power conditioner includes an inverter unit and a control unit that outputs an error signal indicating a mounting error of a first or second current sensor based on a result of detection by the first current sensor and a result of detection by the second current sensor. When output from the inverter unit is varied by a first threshold value or higher during a first predetermined time period, the control unit outputs the error signal if a detection value of the first current sensor is not varied with the variation in the output from the inverter unit during a second predetermined time period and outputs the error signal if a detection value of the second current sensor is not varied with the variation in the output from the inverter unit during the second predetermined time period.

20 Claims, 10 Drawing Sheets

POWER CONDITIONER

CROSS REFERENCE TO RELATED APPLICATIONS

The present application claims priority to Japanese Patent Application No. 2017-001189, filed Jan. 6, 2017, the entire contents of which are incorporated herein by reference.

TECHNICAL FIELD

The present disclosure generally relates to a power conditioner.

BACKGROUND

Existing power management systems include power conditioners that convert direct-current power from power generation apparatuses, such as solar photovoltaic power generation apparatuses, into alternating-current power and interconnect with power systems to supply the power to interior alternating-current loads. In such a system, current sensors are provided for both a U-phase electric wire and a W-phase electric wire in a single-phase three-wire system between the power conditioner and the power system in order to detect a state in which power is supplied from the power system to the interior alternating-current load and a state in which reverse power flow from the power conditioner to the power system is performed for buying and selling of the electric power. In some instances, the current sensors may be mounted in incorrect directions or to wrong electric wires in such a system. Accordingly, systems are proposed in which internal power loads are provided, the electric wires are connected to the internal power loads with connection mechanisms, and the electric current is supplied to the internal power loads to determine any mounting error of the current sensors (for example, as described in International Publication No. 2011/093109).

Since the internal power load and the connection mechanism provided in the power conditioner in order to determine any mounting error of the first current sensor and the second current sensor are required in the above system, the number of components in the power conditioner is disadvantageously increased.

SUMMARY OF THE INVENTION

Accordingly, it is an object of the present disclosure to provide a power conditioner that requires no additional component and that is capable of detecting any mounting error of a current sensor mounted to an electric wire with which a power system is connected to the power conditioner.

According to an exemplary embodiment, a power conditioner is provided that interconnects with a power system of a single-phase three-wire system including a first electric wire, a second electric wire, and a third electric wire, which is a neutral line. The power conditioner includes a conversion unit capable of conversion into direct-current power based on power from a power generation apparatus; an inverter unit capable of converting the direct-current power into alternating-current power and outputting the alternating-current power; and a control unit that outputs an error signal indicating a mounting error of a first current sensor for detecting a current value of the first electric wire or a second current sensor for detecting a current value of the second electric wire based on a result of detection by the first current sensor and a result of detection by the second current sensor.

When the power output from the inverter unit is varied by a first threshold value or higher during a first predetermined time period, the control unit outputs the error signal if a detection value of the first current sensor is not varied with the variation in the output from the inverter unit during a second predetermined time period and outputs the error signal if a detection value of the second current sensor is not varied with the variation in the output from the inverter unit during the second predetermined time period.

With the above configuration, since the control unit outputs the error signal based on the variation in the output from the inverter unit and the variation in the detection value of the first current sensor and outputs the error signal based on the variation in the output from the inverter unit and the variation in the detection value of the second current sensor, the mounting errors of the first current sensor and the second current sensor are capable of being detected. Accordingly, it is possible to detect the mounting error of each of the current sensors with no additional load to detect the error.

In the exemplary power conditioner described above, the second predetermined time period is preferably longer than the first predetermined time period.

The second predetermined time period is a time period during which the variation mode of the output from the inverter unit and the variation mode of the detection values of the first current sensor and the second current sensor are monitored. If a short time period is set as the second predetermined time period, the output from the inverter unit may be varied in the same manner as the load powers of the loads connected to the electric wires over the time period. Since a long time period is set as the second predetermined time period in the power conditioner, the probability of the output from the inverter unit being varied in the same manner as the load powers of the loads is reduced, compared with the case in which a short time period is set as the second predetermined time period. Accordingly, it is possible to more reliably determine whether the first current sensor and the second current sensor are correctly mounted.

In the exemplary power conditioner described above, during non-operation of the inverter unit, it is preferred that the control unit output the error signal based on first system power based on the detection value of the first current sensor and output the error signal based on second system power based on the detection value of the second current sensor.

During the non-operation of the inverter unit, the current flows from the power system to the power conditioner. In other words, during the non-operation of the inverter unit, the direction of the current flowing through the first electric wire and the direction of the current flowing through the second electric wire are constant. For example, when the first current sensor and the second current sensor are correctly mounted, the detection value of the first current sensor is set so as to have a positive value and the detection value of the second current sensor is set so as to have a negative value during the non-operation of the inverter unit. In addition, the voltage between the first electric wire and the third electric wire is set so as to have a positive value and the voltage between the second electric wire and the third electric wire is set so as to have a negative value. In this case, if the first system power or the second system power has a negative value, it is determined that the current sensor corresponding to the power system having a negative value exhibits the mounting error. It is possible to easily detect the mounting error of each of the first current sensor and the second current sensor based on the first system power and the second system power during the non-operation of the inverter unit in the above manner.

In the exemplary power conditioner described above, during the non-operation of the inverter unit, it is preferred that the control unit output the error signal if the first system power is greater than or equal to zero and the second system power is less than zero and output the error signal if the first system power is less than zero and the second system power is greater than or equal to zero.

Advantageously, with the above configuration, it is possible to easily detect the mounting error of each of the first current sensor and the second current sensor based on the fact that the first system power is different from the second system power using zero as the threshold value during the non-operation of the inverter unit.

In the exemplary power conditioner described above, during the non-operation of the inverter unit, when the first system power and the second system power are greater than or equal to zero or less than zero and the output from the inverter unit is varied by the first threshold value or higher during the first predetermined time period, it is preferred that the control unit output the error signal if the first system power is not varied with the variation in the output from the inverter unit during the second predetermined time period and output the error signal if the second system power is not varied with the variation in the output from the inverter unit during the second predetermined time period.

When the first electric wire or the second electric wire is erroneously mounted to the third electric wire, which is a neutral line, both of the system powers may have the same sign during the non-operation of the inverter unit. In this case, the mounting error of each of the current sensors is not capable of being detected during the non-operation of the inverter unit. Accordingly, the control unit outputs the error signal based on comparison between the variation in the output from the inverter unit and the variation in each system power. It is possible to detect the mounting error in which the first current sensor or the second current sensor is erroneously mounted to the third electric wire, which is a neutral line, by detecting the mounting error of each of the current sensors during both the non-operation and the operation of the inverter unit in the above manner.

According to the power conditioner disclosed herein, it is possible to detect any mounting error of a current sensor mounted to an electric wire with which a power system is connected to the power conditioner without requiring no additional component.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
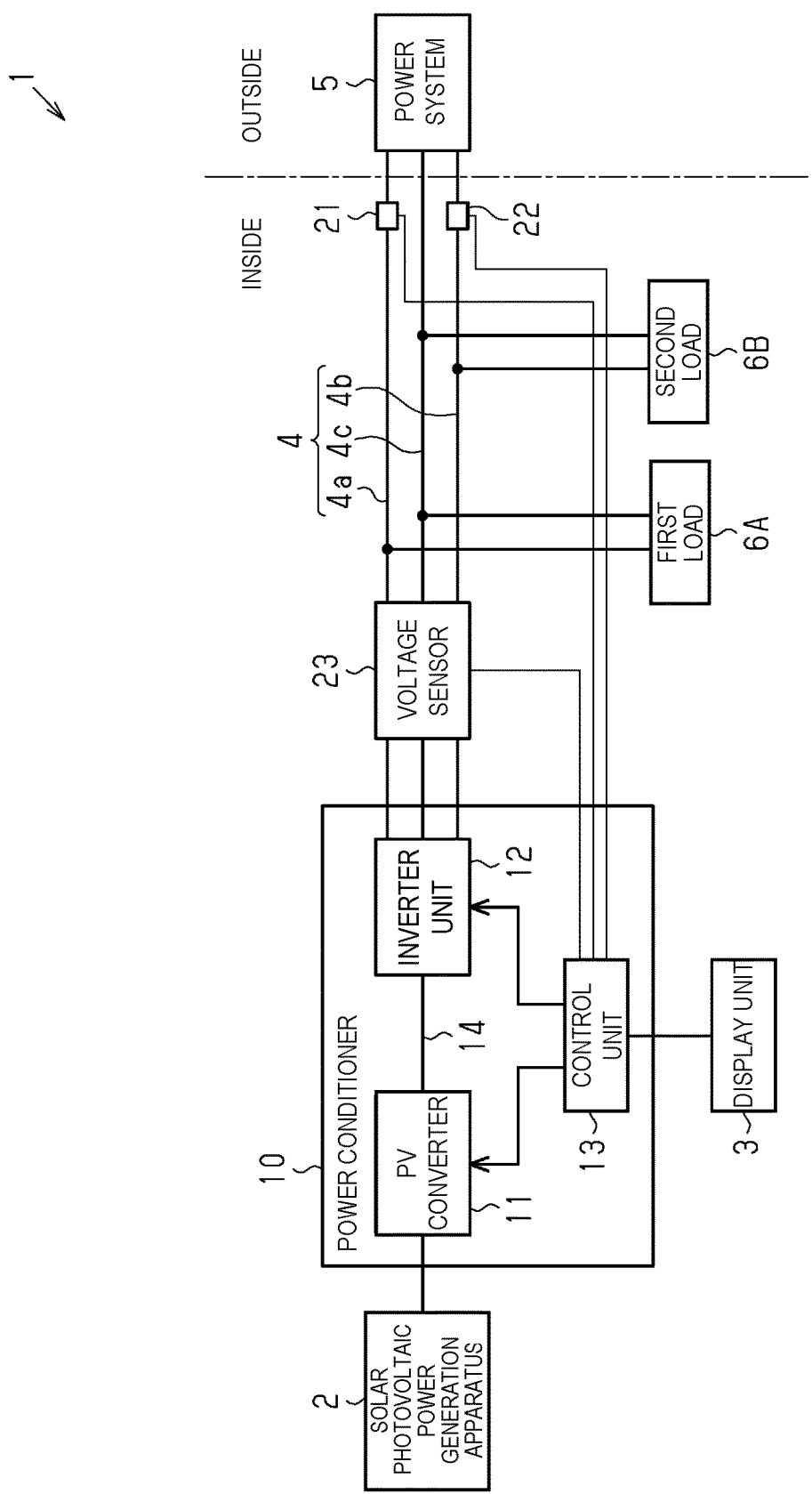
FIG. 1 is a schematic configuration diagram of a power management system according to an exemplary embodiment.

A power conditioner according to an exemplary embodiment will herein be described with reference to the drawings. FIG. 1 illustrates an exemplary configuration of a power management system 1 to which the power conditioner is applied.

Referring to FIG. 1, the power management system 1 includes a power conditioner 10, a solar photovoltaic power generation apparatus 2, which is an example of a power generation apparatus electrically connected to the power conditioner 10, and a display unit 3 that displays the content of the power management system 1. The power conditioner 10 is connected to a power system 5 via an alternating-current bus 4. A first load 6A and a second load 6B are connected to the alternating-current bus 4 via a power distribution board or the like (not illustrated). Each of the loads 6A and 6B is, for example, an interior load. The interior load is exemplified as a light, a refrigerator, a washing machine, an air conditioner, a microwave oven, or the like, and should not be so limited. The power management system 1 performs reverse power flow of power generated by the solar photovoltaic power generation apparatus 2 to the power system 5, supply of power from the power conditioner 10 to the loads 6A and 6B, and supply of power from the power system 5 to the loads 6A and 6B based on the electric power required for the first load 6A and the second load 6B and the amount of electric power generated by the solar photovoltaic power generation apparatus 2.

The solar photovoltaic power generation apparatus 2 includes a photovoltaic panel (not illustrated) and supplies direct-current power generated by the photovoltaic panel to the power conditioner 10. The solar photovoltaic power generation apparatus 2 performs maximum power point tracking control in which current is generated at output voltage at which the electric power output from the photovoltaic panel is maximized.

The display unit 3 displays the amount of electric power generated by the solar photovoltaic power generation apparatus 2, the amount of power consumption by loads 6A and 6B, and so on as the content of the power management system 1. In one aspect, the display unit 3 of the exemplary embodiment is separated from the power conditioner 10. The display unit 3 receives information concerning the content of display from the power conditioner 10. The display unit 3 may be integrated with the power conditioner 10.

The alternating-current bus 4 is a single-phase three-wire system including a first electric wire 4a of a U phase, a second electric wire 4b of a W phase, and a third electric wire 4c of an O phase (neutral line). The first load 6A is connected to the first electric wire 4a and the third electric wire 4c. The second load 6B is connected to the second electric wire 4b and the third electric wire 4c.

The power conditioner 10 interconnects with the power system 5 of the single-phase three-wire system. The power conditioner 10 includes a photovoltaic (PV) converter 11, which is an example of a conversion unit, an inverter or inverter unit (direct current-to-alternating current (DC-AC) converter) 12, and a control unit 13. It is noted the that control unit 13 or controller described herein can comprises a computer processor, a microprocessor, a microcontroller, or the like that includes memory with software stored thereon that, when executed by the processing unit, is configured to each the respective algorithms as described herein.

According to the exemplary aspect, the PV converter 11 is connected to the inverter unit 12 via a high-voltage direct-current bus 14. The power generated by the solar photovoltaic power generation apparatus 2, which is varied in the maximum power point tracking control, is supplied to the PV converter 11. The PV converter 11 is capable of converting the output voltage of the power generated by the solar photovoltaic power generation apparatus 2 into direct-current power having constant voltage and supplying the direct-current power to the high-voltage direct-current bus 14. An example of the constant voltage is about 380 V. The inverter unit 12 is connected to the high-voltage direct-current bus 14. The inverter unit 12 converts the direct-current power on the high-voltage direct-current bus 14 into alternating-current power of, for example, about 100 V and supplies the alternating-current power to the alternating-current bus 4. The control unit 13 controls the operations of the PV converter 11 and the inverter unit 12.

In the exemplary aspect, the first current sensor 21 and a second current sensor 22 are mounted to the alternating-current bus 4 between the loads 6A and 6B and the power system 5. Preferably the first current sensor 21 is mounted to the first electric wire 4a and the second current sensor 22 is mounted to the second electric wire 4b. The result of detection by the first current sensor 21 and the result of detection by the second current sensor 22 are supplied to the control unit 13 in the power conditioner 10 in a wired manner or a wireless manner. Accordingly, the power conditioner 10 is capable of determining whether the power management system 1 is in an electric power buying state (power is supplied from the power system 5 to the loads 6A and 6B) or in an electric power selling state (power generated by the solar photovoltaic power generation apparatus 2 is supplied to the power system 5). The result of detection by the first current sensor 21 includes a detection value Icu, which is a current value detected by the first current sensor 21, and a plus or minus sign of the detection value Icu. The result of detection by the second current sensor 22 includes a detection value Icw, which is a current value detected by the second current sensor 22, and a plus or minus sign of the detection value Icw.

A voltage sensor 23 is mounted to the alternating-current bus 4 between the power conditioner 10 and the loads 6A and 6B. The voltage sensor 23 detects voltage (hereinafter referred to as "voltage Vuo") between the first electric wire 4a and the third electric wire 4c and voltage (hereinafter referred to as "voltage Vwo") between the second electric wire 4b and the third electric wire 4c. The resulting voltage of detection by the voltage sensor 23 is supplied to the control unit 13 in a wired manner or in a wireless manner. The voltage sensor 23 uses the voltage of the O phase as reference voltage. The voltage sensor 23 detects a negative value as the voltage Vwo when the voltage sensor 23 detects a positive value as the voltage Vuo. Although a positive value and a negative value are alternately detected by the voltage sensor 23 because the voltage of the alternating-current bus 4 is alternating-current voltage, the detection value of the voltage sensor 23 is simplified in the following description. For example, it is assumed that a positive value or a negative value is detected at a certain time.

Figure 2:
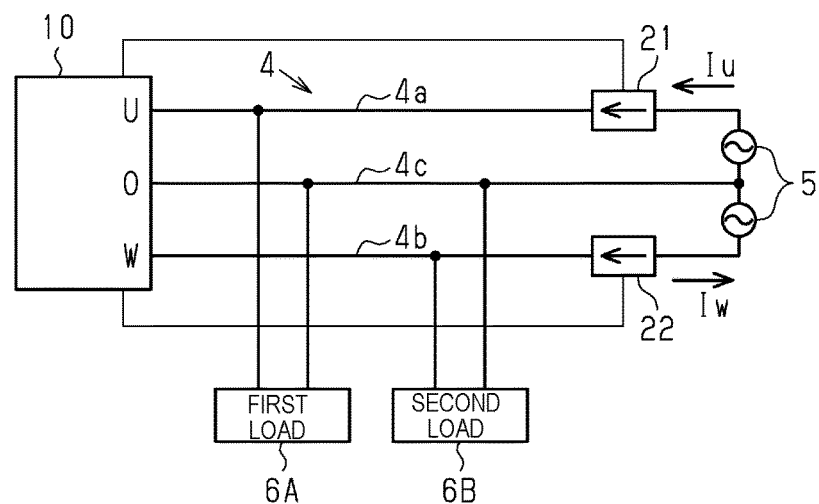
FIG. 2 is a schematic configuration diagram between a power conditioner and a power system when a first current sensor and a second current sensor are correctly mounted according to the exemplary embodiment.

FIG. 2 illustrates a state in which the first current sensor 21 is correctly mounted to the first electric wire 4a and a state in which the second current sensor 22 is correctly mounted to the second electric wire 4b. Arrows indicated in the first current sensor 21 and the second current sensor 22 in FIG. 2 each indicate the direction in which a positive value is detected. When the electric current is supplied from the power system 5 to the first load 6A, the electric current flows from the power system 5 to the first load 6A through the first electric wire 4a, as illustrated in FIG. 2. Accordingly, the first current sensor 21 detects the electric current flowing through the first electric wire 4a as a positive value. When the electric current is supplied from the power system 5 to the second load 6B, the electric current flows from the second load 6B to the power system 5 through the second electric wire 4b, as illustrated in FIG. 2. Accordingly, the second current sensor 22 detects the electric current flowing through the second electric wire 4b as a negative value.

According to the exemplary aspect, the power management system 1 detects the electric power buying state and the electric power selling state based on the results of detection by the first current sensor 21 and the second current sensor 22. Thus, when the first current sensor 21 and the second current sensor 22 are incorrectly mounted, the power management system 1 is not capable of correctly detecting the electric power buying state and the electric power selling state.

Accordingly, the control unit 13 performs mounting error control to determine the mounting states of the first current sensor 21 and the second current sensor 22. If a mounting error occurs in the first current sensor 21, the control unit 13 supplies an error signal indicating that the mounting error occurs in the first current sensor 21 to the display unit 3. If a mounting error occurs in the second current sensor 22, the control unit 13 supplies an error signal indicating that the mounting error occurs in the second current sensor 22 to the display unit 3. The mounting errors of the first current sensor 21 and the second current sensor 22 include a state in which the current sensor is mounted in an incorrect direction, a state in which the current sensor is mounted at an incorrect position, a state in which the current is not capable of being detected by the current sensor (including dropping-off), and so on. The mounting error control includes a mounting error process during non-operation of the inverter unit 12 (refer to FIG. 3) and a mounting error process during operation of the inverter unit 12 (refer to FIG. 7). These mounting error processes are performed based on the detection value (the result of detection) of the first current sensor 21 and the detection value (the result of detection) of the second current sensor 22.

In the present embodiment, in the mounting error processes during the non-operation and the operation of the inverter unit 12, the control unit 13 determines whether any mounting error occurs based on whether U-phase system power Pu, which is an example of first system power, has a positive or negative value and whether W-phase system power Pw, which is an example of second system power, has a positive or negative value. The control unit 13 calculates the U-phase system power Pu by multiplying the detection value Icu of the first current sensor 21 by the voltage Vuo (Pu=Icu×Vuo). The control unit 13 calculates the W-phase system power Pw by multiplying the detection value Icw of the second current sensor 22 by the voltage Vwo (Pw=Icw×Vwo). The control unit 13 calculates the U-phase system power Pu and the W-phase system power Pw every predetermined time period. The calculation period of the U-phase system power Pu and the W-phase system power Pw is sufficiently shorter than the control periods of the mounting error processes illustrated in FIG. 3 and FIG. 7. The U-phase system power Pu and the W-phase system power Pw may be calculated by a control apparatus outside the power conditioner 10. In this case, the control unit supplies the U-phase system power Pu and the W-phase system power Pw to the control unit 13.

In mounting of the power conditioner 10, after the control unit 13 performs the mounting error process during the non-operation of the inverter unit 12, the control unit 13 performs the mounting error process during the operation of the inverter unit 12. After the mounting of the power conditioner 10, the control unit 13 performs the mounting error process during the operation of the inverter unit 12 every predetermined time period.

The mounting error process during the non-operation of the inverter unit 12 will now be described with reference to FIG. 3 to FIG. 6. The current sensors that are shaded in FIG. 4 to FIG. 6 are the current sensors exhibiting the mounting errors. This mounting error process is performed based on the U-phase system power Pu and the W-phase system power Pw when the voltage Vuo of the U phase has a positive value and the voltage Vwo of the W phase has a negative value.

Figure 3:
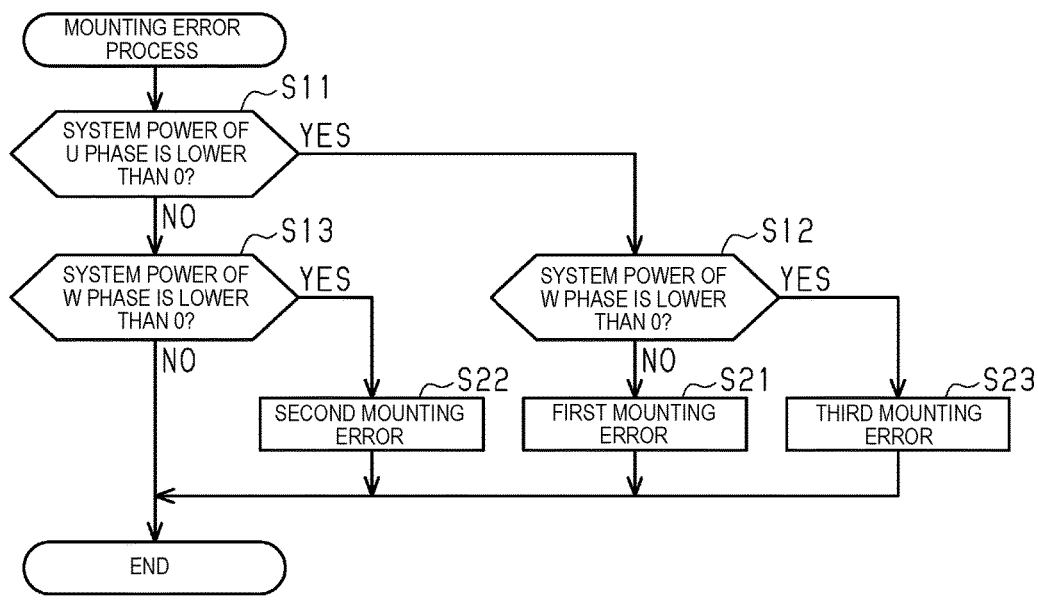
FIG. 3 is a flowchart illustrating a mounting error process performed by a control unit during non-operation of an inverter unit according to the exemplary embodiment.

Referring to FIG. 3, in Step S11, the control unit 13 determines whether the U-phase system power Pu is less than zero. In Step S12 and Step S13, the control unit 13 determines whether the W-phase system power Pw is less than zero.

As shown, if the control unit 13 determines that the U-phase system power Pu is less than zero (YES in Step S11) and the W-phase system power Pw is greater than or equal to zero (NO in Step S12), in Step S21, the control unit 13 supplies an error signal indicating a first mounting error to the display unit 3 (refer to FIG. 1).

In the exemplary aspect, the first mounting error has first patterns in which the first current sensor 21 exhibits the mounting error because the detection value Icu of the first current sensor 21 has a negative value and the second current sensor 22 is correctly mounted and a second pattern in which the first current sensor 21 and the second current sensor 22 exhibit the mounting errors. Accordingly, mounting modes of the current sensors 21 and 22 exhibiting the first mounting error include the first patterns illustrated in FIG. 4A and FIG. 4B and the second pattern illustrated in FIG. 4C.

Figure 4A:
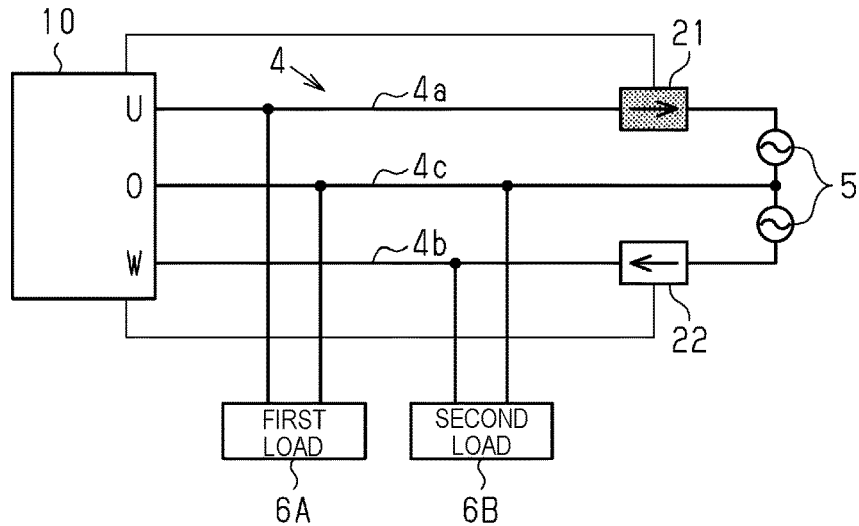
FIGS. 4A to 4C are schematic configuration diagrams illustrating a first mounting error.

In the first pattern illustrated in FIG. 4A, the first current sensor 21 is mounted to the first electric wire 4a in the opposite direction. In this case, since the detection value Icu of the first current sensor 21 has a negative value, the U-phase system power Pu resulting from multiplication of the detection value Icu by the voltage Vuo, which has a positive value, is less than zero. In contrast, the second current sensor 22 is correctly mounted to the second electric wire 4b. In this case, since the detection value Icw of the second current sensor 22 has a negative value, the W-phase system power Pw resulting from multiplication of the detection value Icw by the voltage Vwo, which has a negative value, is greater than or equal to zero. In the first pattern illustrated in FIG. 4A, the magnitude relationship between the load power of the first load 6A and the load power of the second load 6B is not made a requirement.

Figure 4B:
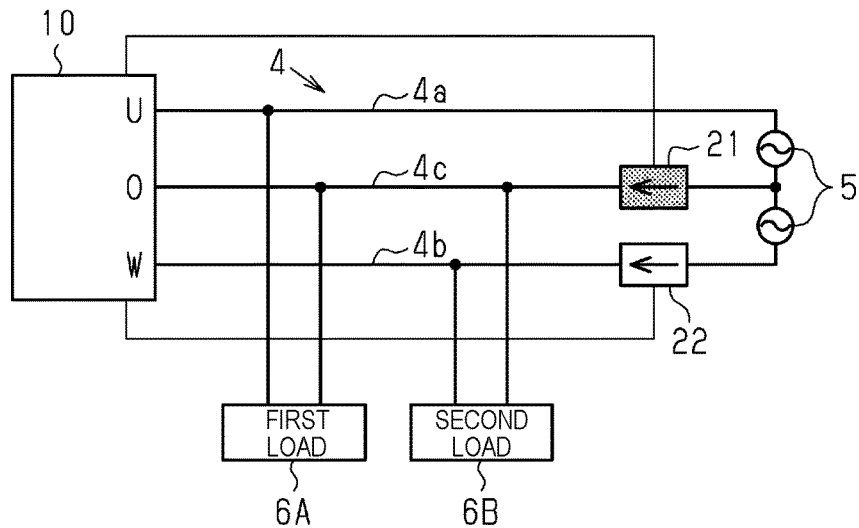

In the first pattern illustrated in FIG. 4B, the load power of the first load 6A is required to be higher than the load power of the second load 6B. Since the load power of the first load 6A is higher than the load power of the second load 6B, current Iu flowing through the first electric wire 4a is greater than current Iw flowing through the second electric wire 4b (Iu>Iw). Current Io flowing through the third electric wire 4c is equal to Iu−Iw. Accordingly, the current flows from the power conditioner 10 side to the power system 5 side through the third electric wire 4c. As illustrated in FIG. 4B, the first current sensor 21 is mounted to the third electric wire 4c. The direction in which the first current sensor 21 is mounted is correct. In this case, since the detection value Icu of the first current sensor 21 has a negative value, the U-phase system power Pu is less than zero. In contrast, the second current sensor 22 is correctly mounted to the second electric wire 4b. In this case, since the detection value Icw of the second current sensor 22 has a negative value, the W-phase system power Pw is greater than or equal to zero.

Figure 4C:
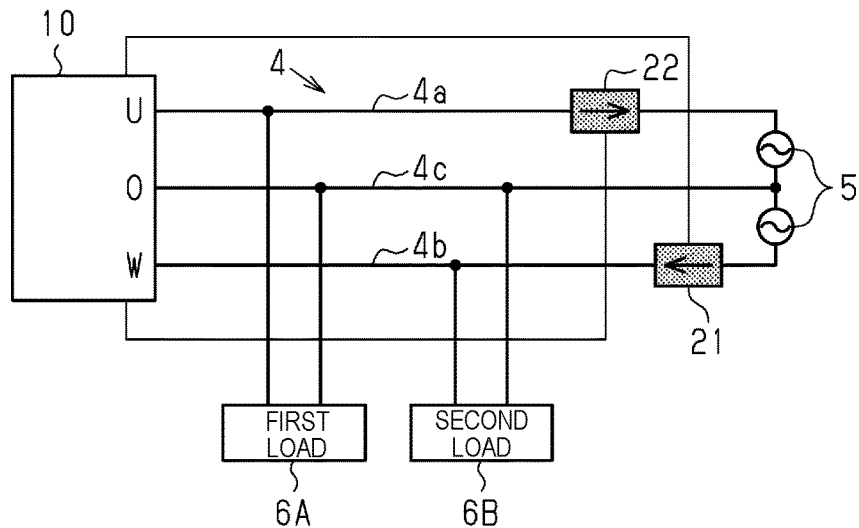

In the second pattern illustrated in FIG. 4C, the first current sensor 21 is mounted to the second electric wire 4b and the second current sensor 22 is mounted to the first electric wire 4a. The first current sensor 21 is mounted to the second electric wire 4b in the correct direction while the second current sensor 22 is mounted to the first electric wire 4a in the opposite direction. In this case, since the detection value Icu of the first current sensor 21, which detects the current through the second electric wire 4b, has a negative value, the U-phase system power Pu resulting from multiplication of the detection value Icu by the voltage Vuo, which has a positive value, is less than zero. In contrast, since the detection value Icw of the second current sensor 22, which detects the current through the first electric wire 4a, has a negative value, the W-phase system power Pw resulting from multiplication of the detection value Icw by the voltage Vwo, which has a negative value, is greater than or equal to zero. In the second pattern illustrated in FIG. 4C, the magnitude relationship between the load power of the first load 6A and the load power of the second load 6B is not made a requirement.

Referring back to FIG. 3, if the control unit 13 determines that the U-phase system power Pu is greater than or equal to zero (NO in Step S11) and the W-phase system power Pw is less than zero (YES in Step S13), in Step S22, the control unit 13 supplies an error signal indicating a second mounting error to the display unit 3.

The second mounting error has first patterns in which the second current sensor 22 exhibits the mounting error because the detection value Icw of the second current sensor 22 has a positive value and the first current sensor 21 is correctly mounted and a second pattern in which the first current sensor 21 and the second current sensor 22 exhibit the mounting errors. Accordingly, mounting modes of the current sensors 21 and 22 exhibiting the second mounting error include the first patterns illustrated in FIG. 5A and FIG. 5B and the second pattern illustrated in FIG. 5C.

Figure 5A:
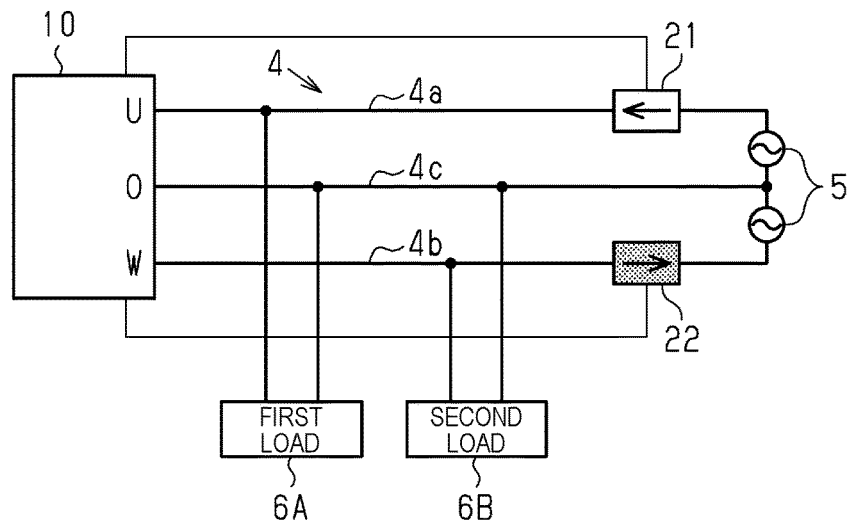
FIGS. 5A to 5C are schematic configuration diagrams illustrating a second mounting error.

In the first pattern illustrated in FIG. 5A, the second current sensor 22 is mounted to the second electric wire 4b in the opposite direction. In this case, since the detection value Icw of the second current sensor 22 has a positive value, the W-phase system power Pw resulting from multiplication of the detection value Icw by the voltage Vwo, which has a negative value, is less than zero. In contrast, the first current sensor 21 is correctly mounted to the first electric wire 4a. In this case, since the detection value Icu of the first current sensor 21 has a positive value, the U-phase system power Pu resulting from multiplication of the detection value Icu by the voltage Vuo, which has a positive value, is greater than or equal to zero. In the first pattern illustrated in FIG. 5A, the magnitude relationship between the load power of the first load 6A and the load power of the second load 6B is not made a requirement.

Figure 5B:
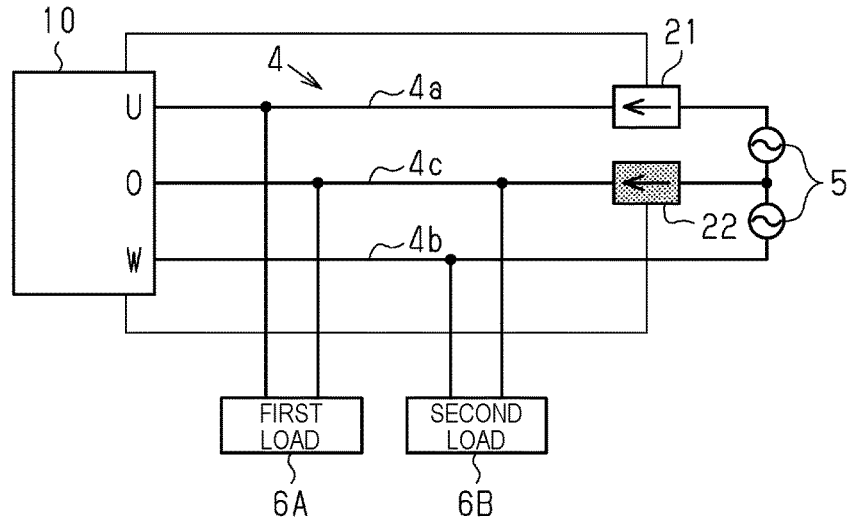

In the first pattern illustrated in FIG. 5B, the load power of the second load 6B is required to be higher than the load power of the first load 6A. Accordingly, the current flows from the power system 5 side to the power conditioner 10 side through the third electric wire 4c. As illustrated in FIG. 5B, the second current sensor 22 is mounted to the third electric wire 4c. The direction in which the second current sensor 22 is mounted is correct. In this case, since the detection value Icw of the second current sensor 22, which detects the current through the third electric wire 4c, has a positive value, the W-phase system power Pw resulting from multiplication of the detection value Icw by the voltage Vwo, which has a negative value, is less than zero. In contrast, the first current sensor 21 is correctly mounted to the first electric wire 4a. In this case, since the detection value Icu of the first current sensor 21 has a positive value, the U-phase system power Pu is greater than or equal to zero.

Figure 5C:
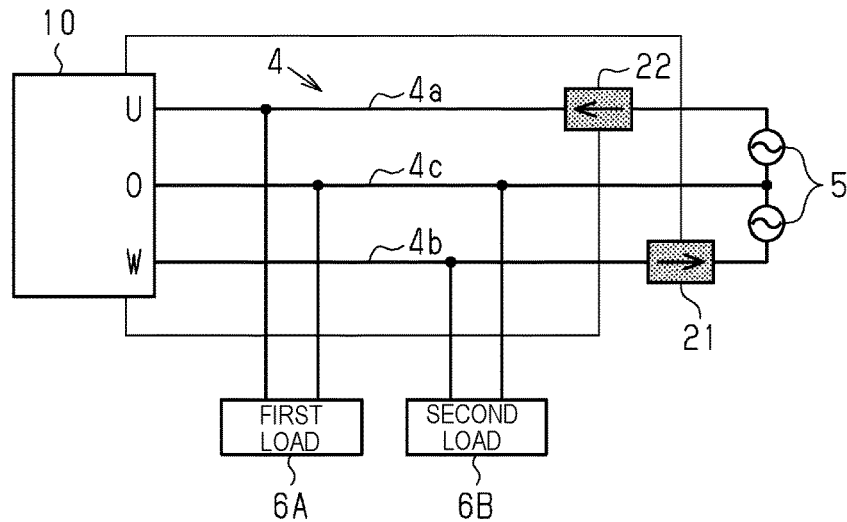

In the second pattern illustrated in FIG. 5C, the first current sensor 21 is mounted to the second electric wire 4b and the second current sensor 22 is mounted to the first electric wire 4a. The first current sensor 21 is mounted to the second electric wire 4b in the opposite direction while the second current sensor 22 is mounted to the first electric wire 4a in the correct direction. In this case, since the detection value Icw of the second current sensor 22, which detects the current through the first electric wire 4a, has a positive value, the W-phase system power Pw resulting from multiplication of the detection value Icw by the voltage Vwo, which has a negative value, is less than zero. In contrast, since the detection value Icu of the first current sensor 21, which detects the current through the second electric wire 4b, has a positive value, the U-phase system power Pu resulting from multiplication of the detection value Icu by the voltage Vuo, which has a positive value, is greater than or equal to zero.

Referring back to FIG. 3, if the control unit 13 determines that the U-phase system power Pu is less than zero (YES in Step S11) and the W-phase system power Pw is less than zero (YES in Step S12), in Step S23, the control unit 13 supplies an error signal indicating a third mounting error to the display unit 3.

Figure 6A:
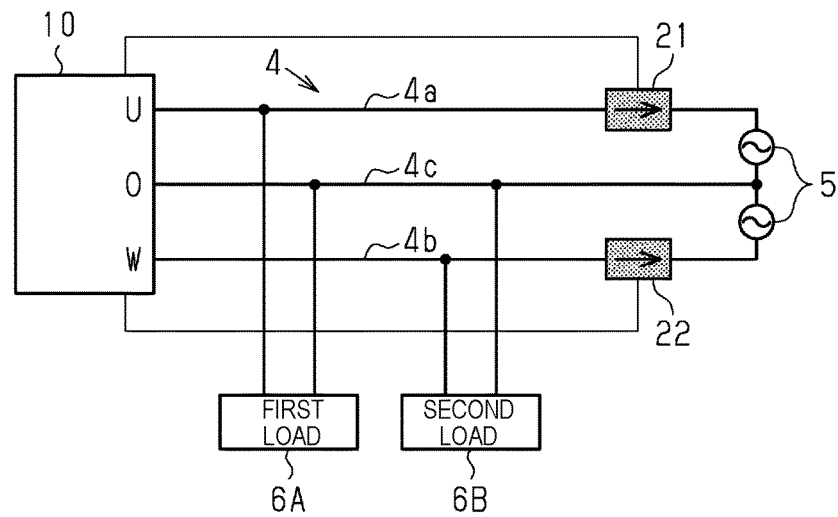
FIGS. 6A and 6B are schematic configuration diagrams illustrating a third mounting error.
Figure 6B:
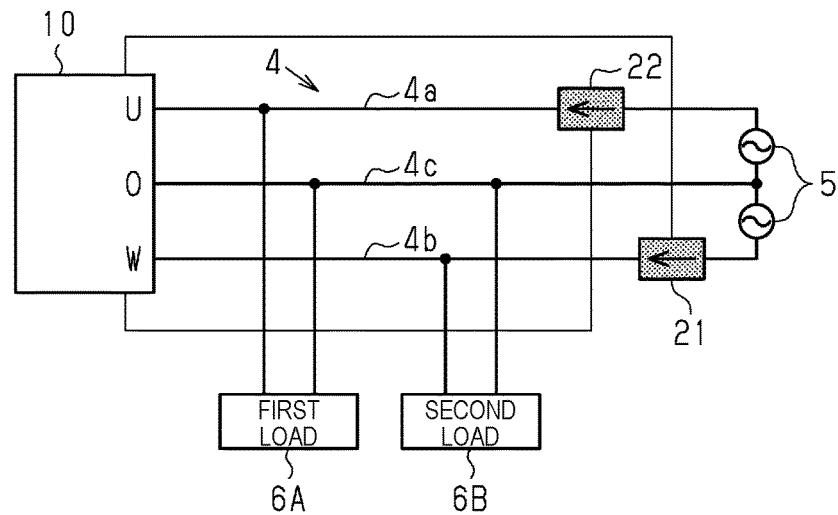

Mounting modes of the current sensors 21 and 22 exhibiting the third mounting error include patterns illustrated in FIG. 6A and FIG. 6B. In the pattern illustrated in FIG. 6A, the first current sensor 21 is mounted to the first electric wire 4a in the opposite direction. In this case, since the detection value Icu of the first current sensor 21 has a negative value, the U-phase system power Pu resulting from multiplication of the detection value Icu by the voltage Vuo, which has a positive value, is less than zero. The second current sensor 22 is mounted to the second electric wire 4b in the opposite direction. In this case, since the detection value Icw of the second current sensor 22 has a positive value, the W-phase system power Pw resulting from multiplication of the detection value Icw by the voltage Vwo, which has a negative value, is less than zero.

In the pattern illustrated in FIG. 6B, the first current sensor 21 is mounted to the second electric wire 4b and the second current sensor 22 is mounted to the first electric wire 4a. The directions in which the first current sensor 21 and the second current sensor 22 are mounted are correct. In this case, since the detection value Icu of the first current sensor 21 has a negative value, the U-phase system power Pu is less than zero. Since the detection value Icw of the second current sensor 22 has a positive value, the W-phase system power Pw is less than zero.

Referring back to FIG. 3, if the control unit 13 determines that the U-phase system power Pu is greater than or equal to zero (NO in Step S11) and the W-phase system power Pw is greater than or equal to zero (NO in Step S13), the process illustrated in FIG. 3 is terminated. In other words, since the current sensors 21 and 22 are correctly mounted, the control unit 13 supplies no error signal to the display unit 3.

Upon reception of the error signal indicating any of the first to third mounting errors from the control unit 13, the display unit 3 displays the kind of the mounting error. In this case, the operator (mounter) is capable of narrowing down the pattern of the mounting errors of the first current sensor 21 and the second current sensor 22 from the kind of the mounting error displayed in the display unit 3. The operator correctly mounts the current sensor exhibiting the mounting error, among the first current sensor 21 and the second current sensor 22, based on the pattern of the mounting error, which is narrowed down. The control unit 13 stops the operation of the power conditioner 10 when the control unit 13 supplies the error signal corresponding to any of the first to third mounting errors to the display unit 3.

The mounting error process during the operation of the inverter unit 12 will now be described with reference to FIG. 7 to FIG. 10. The current sensors that are shaded in FIG. 8 to FIG. 10 are the current sensors exhibiting the mounting errors. The current sensors to which "X" marks are added in FIG. 8 to FIG. 10 are the current sensors that dropped off or failed according to an example. This mounting error process is performed based on the U-phase system power Pu and the W-phase system power Pw when the voltage Vuo of the U phase has a positive value and the voltage Vwo of the W phase has a negative value.

Figure 7:
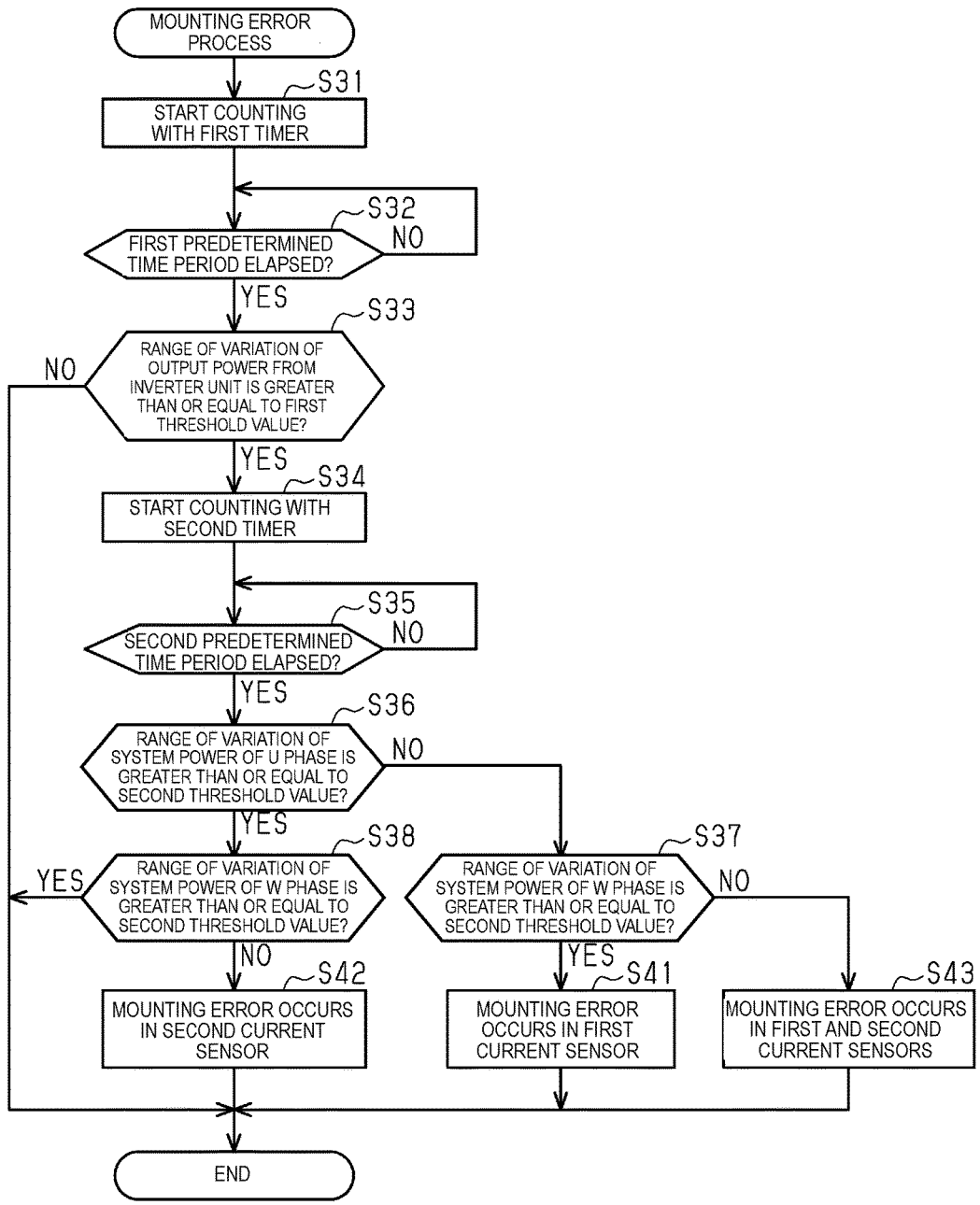
FIG. 7 is a flowchart illustrating a mounting error process performed by the control unit during operation of the inverter unit.

Referring to FIG. 7, in Step S31, the control unit 13 starts counting with a first timer. In Step S32, the control unit 13 determines whether a first predetermined time period elapsed since the counting with the first timer has been started. The control unit 13 monitors and records the output power from the inverter unit 12 during the first predetermined time period. The first predetermined time period is, for example, a time period in which the output power from the inverter unit 12 is caused to be varied by a predetermined amount. An example of the first predetermined time period is about 100 ms. The control unit 13 calculates the output power from the inverter unit 12 by adding the result of multiplication of the current value supplied from the inverter unit 12 to the first electric wire 4a by the voltage Vuo to the result of multiplication of the current value supplied from the inverter unit 12 to the second electric wire 4b by the voltage Vwo.

If the control unit 13 determines that the first predetermined time period did not elapse since the counting with the first timer has been started (NO in Step S32), the process goes back to the determination in Step S32. If the control unit 13 determines that the first predetermined time period elapsed since the counting with the first timer has been started (YES in Step S32), in Step S33, the control unit 13 determines whether the range of variation of the output power from the inverter unit 12 is greater than or equal to a first threshold value. It is sufficient for the first threshold value to have a magnitude, for example, at which the variations in the detection values Icu and Icw of the current sensors 21 and 22 are capable of being detected with respect to the variation in the output power from the inverter unit 12. An example of the first threshold value is about 50 W.

If the control unit 13 determines that the range of variation of the output power from the inverter unit 12 is less than the first threshold value (NO in Step S33), the process illustrated in FIG. 7 is terminated. If the control unit 13 determines that the range of variation of the output power from the inverter unit 12 is greater than or equal to the first threshold value (YES in Step S33), in Step S34, the control unit 13 starts counting with a second timer. In Step S35, the control unit 13 determines whether a second predetermined time period elapsed since the counting with the second timer has been started. The control unit 13 monitors and records the detection values Icu and Icw of the current sensors 21 and 22, respectively, during the second predetermined time period. The second predetermined time period is, for example, a time period in which it is determined that the variation in the output power from the inverter unit 12 is different from the variations in the loads 6A and 6B. An example of the second predetermined time period is about three seconds.

If the control unit 13 determines that the second predetermined time period did not elapse since the counting with the second timer has been started (NO in Step S35), the process goes back to the determination in Step S35. If the control unit 13 determines that the second predetermined time period elapsed since the counting with the second timer has been started (YES in Step S35), in Step S36, the control unit 13 determines whether the range of variation of the U-phase system power Pu with respect to the variation in the output power from the inverter unit 12 is greater than or equal to a second threshold value. After the determination in Step S36, in Step S37 and Step S38, the control unit 13 determines whether the range of variation of the W-phase system power Pw with respect to the variation in the output power from the inverter unit 12 is greater than or equal to the second threshold value. For example, the second threshold value is a value used to determine whether the U-phase system power Pu and the W-phase system power Pw are varied with respect to the variation in the output power from the inverter unit 12. For example, the second threshold value is about 20 W when the load power of the first load 6A is equal to the load power of the second load 6B and the range of variation of the output power from the inverter unit 12 is about 50 W or higher. In addition, for example, the range of variation of the U-phase system power Pu is determined by the difference between the minimum value and the maximum value of the U-phase system power Pu during the second predetermined time period, and the range of variation of the W-phase system power Pw is determined by the difference between the minimum value and the maximum value of the W-phase system power Pw during the second predetermined time period.

If the control unit 13 determines that the range of variation of the U-phase system power Pu with respect to the variation in the output power from the inverter unit 12 is less than the second threshold value (NO in Step S36) and the range of variation of the W-phase system power Pw with respect to the variation in the output power from the inverter unit 12 is greater than or equal to the second threshold value (YES in Step S37), in Step S41, the control unit 13 supplies the error signal indicating that the first current sensor 21 exhibits the mounting error to the display unit 3.

The mounting error of the first current sensor 21 includes a first pattern in which the first current sensor 21 drops off from the first electric wire 4a or the first current sensor 21 does not operate due to any failure and a second pattern in which the first current sensor 21 is not correctly mounted. Mounting modes of the current sensors 21 and 22 in these patterns include the first pattern illustrated in FIG. 8A and the second pattern illustrated in FIG. 8B.

Figure 8A:
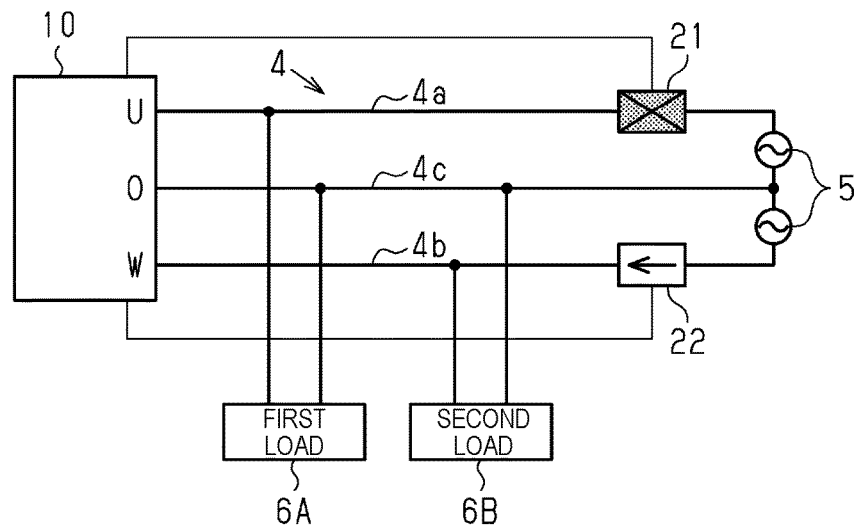
FIGS. 8A and 8B are schematic configuration diagrams illustrating mounting errors of the first current sensor.

In the first pattern illustrated in FIG. 8A, the first current sensor 21 drops off from the first electric wire 4a or does not operate due to any failure. In this case, since the detection value Icu of the first current sensor 21 is fixed to zero or a certain value, the range of variation of the U-phase system power Pu is less than the second threshold value (0). The second current sensor 22 is correctly mounted to the second electric wire 4b. In this case, since the detection value Icw of the second current sensor 22 is varied with the variation in the output power from the inverter unit 12, the range of variation of the W-phase system power Pw is greater than or equal to the second threshold value. In the first pattern illustrated in FIG. 8A, the magnitude relationship between the load power of the first load 6A and the load power of the second load 6B is not made a requirement.

Figure 8B:
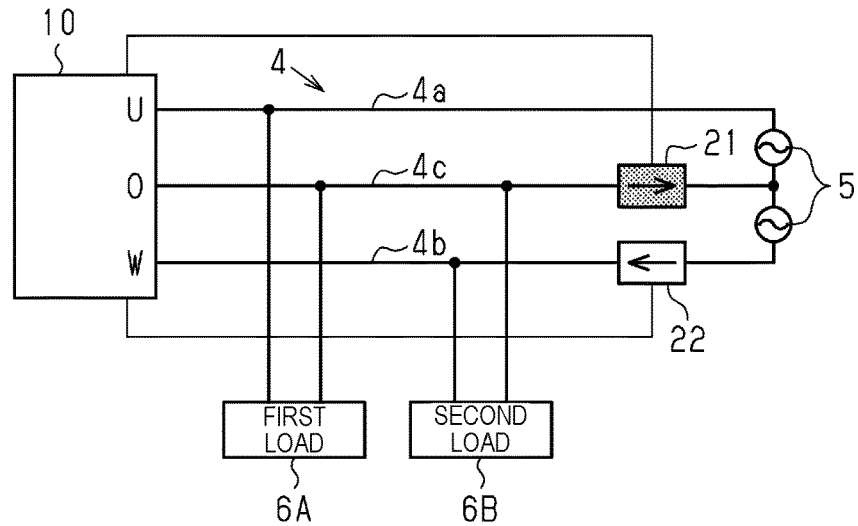

In the second pattern illustrated in FIG. 8B, the load power of the first load 6A is required to be higher than the load power of the second load 6B. Accordingly, the current flows from the power conditioner 10 side to the power system 5 side through the third electric wire 4c. As illustrated in FIG. 8B, the first current sensor 21 is mounted to the third electric wire 4c and is mounted in the opposite direction. The second current sensor 22 is correctly mounted to the second electric wire 4b.

In the mounting mode of the current sensors 21 and 22 illustrated in FIG. 8B, since the U-phase system power Pu and the W-phase system power Pw are greater than zero during the non-operation of the inverter unit 12, the control unit 13 determines that the current sensors 21 and 22 are correctly mounted and supplies no error signal to the display unit 3.

However, when the electric power is supplied from the inverter unit 12 to the alternating-current bus 4, the current Iu of the first electric wire 4a and the current Iw of the second electric wire 4b are decreased by an amount corresponding to output current Ipc from the inverter unit 12. In other words, during the operation of the inverter unit 12, the current Io flowing through the third electric wire 4c is (Iu−Ipc)−(Iw−Ipc)=Iu−Iw and is not varied. Accordingly, during the operation of the inverter unit 12, the range of variation of the U-phase system power Pu based on the detection value Icu of the first current sensor 21 is less than the second threshold value (0). Since the detection value Icw of the second current sensor 22 is varied with the variation in the output power from the inverter unit 12, the range of variation of the W-phase system power Pw is greater than or equal to the second threshold value.

Referring back to FIG. 7, if the control unit 13 determines that the range of variation of the U-phase system power Pu with respect to the variation in the output power from the inverter unit 12 is greater than or equal to the second threshold value (YES in Step S36) and that the range of variation of the W-phase system power Pw with respect to the variation in the output power from the inverter unit 12 is less than the second threshold value (NO in Step S38), in Step S42, the control unit 13 supplies the error signal indicating that the second current sensor 22 exhibits the mounting error to the display unit 3.

The mounting error of the second current sensor 22 includes a first pattern in which the second current sensor 22 drops off from the second electric wire 4b or the second current sensor 22 does not operate due to any failure and a second pattern in which the second current sensor 22 is not correctly mounted. Mounting modes of the current sensors 21 and 22 in these patterns include the first pattern illustrated in FIG. 9A and the second pattern illustrated in FIG. 9B.

Figure 9A:
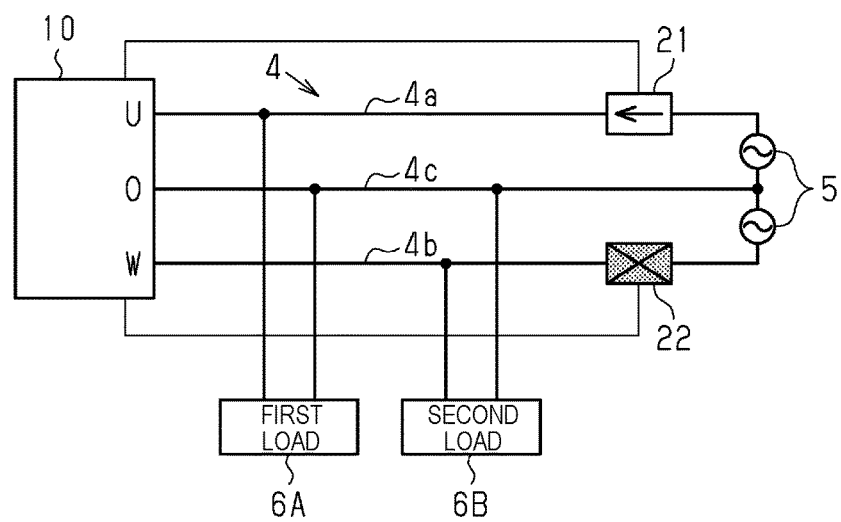
FIGS. 9A and 9B are schematic configuration diagrams illustrating mounting errors of the second current sensor.
Figure 10:
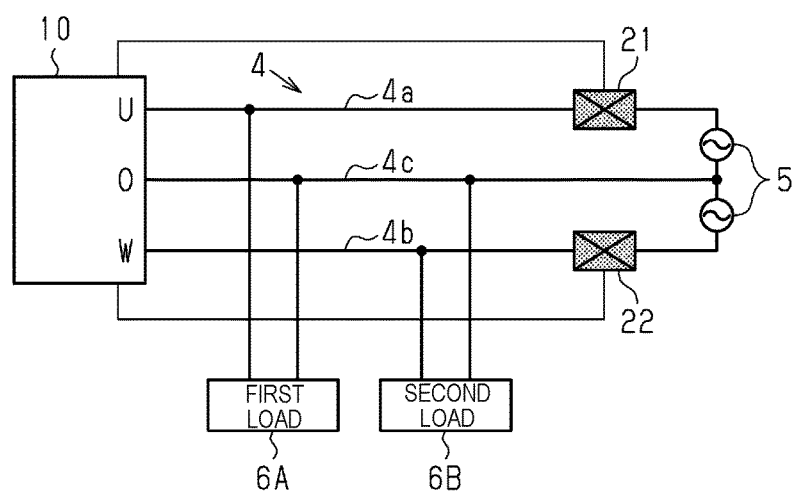
FIG. 10 is a schematic configuration diagram illustrating mounting errors of the first current sensor and the second current sensor.

In the first pattern illustrated in FIG. 9A, the first current sensor 21 is correctly mounted to the first electric wire 4*a*. In this case, since the detection value Icu of the first current sensor 21 is varied with the variation in the output power from the inverter unit 12, the range of variation of the U-phase system power Pu is greater than or equal to the second threshold value. The second current sensor 22 drops off from the second electric wire 4*b* or does not operate due to any failure. In this case, since the detection value Icw of the second current sensor 22 is fixed to zero or a certain value, the range of variation of the W-phase system power Pw is less than the second threshold value (0). In the first pattern illustrated in FIG. 9A, the magnitude relationship between the load power of the first load 6A and the load power of the second load 6B is not made a requirement.

Figure 9B:
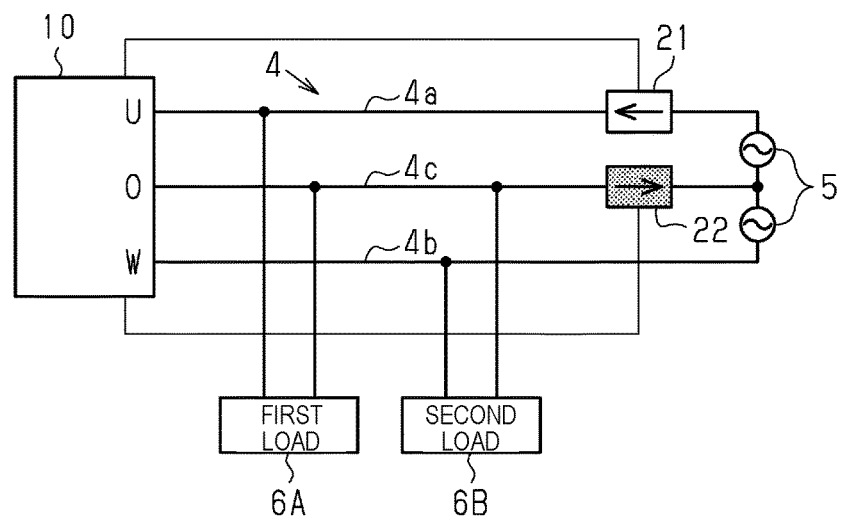

In the second pattern illustrated in FIG. 9B, the load power of the first load 6A is required to be higher than the load power of the second load 6B. Accordingly, the current flows from the power conditioner 10 side to the power system 5 side through the third electric wire 4*c*. As illustrated in FIG. 9B, the first current sensor 21 is correctly mounted to the first electric wire 4*a*. The second current sensor 22 is mounted to the third electric wire 4*c* and is mounted in the opposite direction. In the mounting mode of the current sensors 21 and 22 illustrated in FIG. 9B, the mounting error is capable of being detected, as in the mounting mode of the current sensors 21 and 22 illustrated in FIG. 8B.

Referring back to FIG. 7, if the control unit 13 determines that both the range of variation of the U-phase system power Pu and the range of variation of the W-phase system power Pw with respect to the variation in the output from the inverter unit 12 are less than the second threshold value (NO in Step S36 and NO in Step S37), in Step S43, the control unit 13 supplies the error signal indicating that the first current sensor 21 and the second current sensor 22 exhibit the mounting errors to the display unit 3.

As illustrated in FIG. 10, in the mounting errors of both the first current sensor 21 and the second current sensor 22, the first current sensor 21 drops off from the first electric wire 4*a* or does not operate due to any failure and the second current sensor 22 drops off from the second electric wire 4*b* or does not operate due to any failure. In this case, the detection value Icu and the detection value Icw of the current sensors 21 and 22, respectively, are equal to zero or fixed values, the ranges of variation of the U-phase system power Pu and the W-phase system power Pw are less than the second threshold value (0).

Referring back to FIG. 7, if the control unit 13 determines that both the range of variation of the U-phase system power Pu and the range of variation of the W-phase system power Pw with respect to the variation in the output from the inverter unit 12 are greater than or equal to the second threshold value (YES in Step S36 and YES in Step S38), the process illustrated in FIG. 7 is terminated. In this case, since the first current sensor 21 and the second current sensor 22 do not drop off or do not fail, the control unit 13 supplies no error signal to the display unit 3.

Upon reception of the error signal from the control unit 13, the display unit 3 (refer to FIG. 1) displays the kind of the mounting error. In this case, the operator (mounter) is capable of narrowing down the pattern of the mounting error of the first current sensor 21 and the second current sensor 22 from the kind of the mounting error displayed in the display unit 3. The operator correctly mounts the current sensor exhibiting the mounting error, among the first current sensor 21 and the second current sensor 22, based on the pattern of the mounting error, which is narrowed down. Since the mounting error is displayed in the display unit 3 after the mounting, the owner of the power management system 1 is capable of indicating the mounting error to the mounter. The control unit 13 stops the operation of the power conditioner 10 when the control unit 13 displays the error signal corresponding to any of the mounting errors of the current sensors 21 and 22 in the display unit 3.

The effects of the present embodiment will now be described.

During the non-operation of the inverter unit 12, the current is supplied from the power system 5 to the first load 6A and the second load 6B. In this case, the U-phase system power Pu is equal to the load power of the first load 6A and the W-phase system power Pw is equal to the load power of the second load 6B. Accordingly, if the first current sensor 21 is correctly mounted to the first electric wire 4*a* and the second current sensor 22 is correctly mounted to the second electric wire 4*b*, the U-phase system power Pu and the W-phase system power Pw have positive values. In other words, the current sensor corresponding to the system power having a negative value, among the U-phase system power Pu and the W-phase system power Pw, exhibits the mounting error.

During the non-operation of the inverter unit 12, the control unit 13 outputs the error signal indicating the mounting error of the current sensor corresponding to the system power having a negative value, among the U-phase system power Pu and the W-phase system power Pw. Accordingly, the control unit 13 is capable of detecting the mounting error of each of the current sensors 21 and 22 based on whether each of the U-phase system power Pu and the W-phase system power Pw has a positive value or a negative value during the non-operation of the inverter unit 12.

During the operation of the inverter unit 12, the current is supplied from the power conditioner 10 and the power system 5 to the first load 6A and the second load 6B. In this case, the sum of the output power from the inverter unit 12 to the first load 6A and the U-phase system power Pu is equal to the load power of the first load 6A and the sum of the output power from the inverter unit 12 to the second load 6B and the W-phase system power Pw is equal to the load power of the second load 6B. Accordingly, the U-phase system power Pu is increased when the output power from the inverter unit 12 to the first load 6A is decreased, and the U-phase system power Pu is decreased when the output power from the inverter unit 12 to the first load 6A is increased. The W-phase system power Pw is increased when the output power from the inverter unit 12 to the second load 6B is decreased, and the W-phase system power Pw is decreased when the output power from the inverter unit 12 to the second load 6B is increased. The U-phase system power Pu and the W-phase system power Pw are varied with the variation in the output power from the inverter unit 12 in the above manner. Accordingly, the current sensor corresponding to the system power that is not varied with the variation in the output power from the inverter unit 12, among the U-phase system power Pu and the W-phase system power Pw, exhibits the mounting error or fails.

During the operation of the inverter unit 12, the control unit 13 outputs the error signal indicating the mounting error of the current sensor corresponding to the system power that is not varied with the variation in the output power from the inverter unit 12, among the U-phase system power Pu and the W-phase system power Pw. Accordingly, the control unit 13 is capable of detecting the mounting error or any failure of each of the current sensors 21 and 22 based on whether each of the U-phase system power Pu and the W-phase system power Pw is varied with the variation in the output power from the inverter unit 12 during the operation of the inverter unit 12.

As described above, according to the present embodiment, the following advantages are achieved.

The control unit 13 outputs the error signal based on the variation in the output from the inverter unit 12 and the variations in the U-phase system power Pu and the W-phase system power Pw, that is, the variations in the detection value Icu of the first current sensor 21 and the detection value Icw of the second current sensor 22. Accordingly, it is possible to detect the mounting error of each of the current sensors 21 and 22 with no additional load to detect the error.

In addition, if the first current sensor 21 and the second current sensor 22 exhibit the mounting errors, which are caused by the falling-off or the like of the first current sensor 21 and the second current sensor 22 after the first current sensor 21 and the second current sensor 22 are correctly mounted, the U-phase system power Pu and the W-phase system power Pw are not varied with the variation in the output from the inverter unit 12. Accordingly, the control unit 13 is capable of detecting the mounting errors caused by the falling-off or the like of the first current sensor 21 and the second current sensor 22 after the first current sensor 21 and the second current sensor 22 are correctly mounted.

(2) The second predetermined time period is a time period during which the variation mode of the output from the inverter unit 12 and the variation mode of the U-phase system power Pu and the W-phase system power Pw, that is, the variation mode of the detection value Icu of the first current sensor 21 and the detection value Icw of the second current sensor 22 are monitored. If a short time period is set as the second predetermined time period, the output power from the inverter unit 12 may be varied in the same manner as the load powers of the first load 6A connected to the first electric wire 4a and the second load 6B connected to the second electric wire 4b over the time period. Since a long time period is set as the second predetermined time period in the power conditioner 10 of the present embodiment, the probability of the output power from the inverter unit 12 being varied in the same manner as the load powers of the loads 6A and 6B is reduced, compared with the case in which a short time period is set as the second predetermined time period. Accordingly, the control unit 13 is capable of more reliably determining whether the first current sensor 21 and the second current sensor 22 are correctly mounted.

(3) During the non-operation of the inverter unit 12, the current flows from the power system 5 to the power conditioner 10. In other words, during the non-operation of the inverter unit 12, the direction of the current flowing through the first electric wire 4a and the direction of the current flowing through the second electric wire 4b are constant. Because of the constant direction of the currents, for example, when the first current sensor 21 and the second current sensor 22 are correctly mounted, the detection value Icu of the first current sensor 21 has a positive value and the detection value Icw of the second current sensor 22 has a negative value during the non-operation of the inverter unit 12. Accordingly, the U-phase system power Pu resulting from multiplication of the voltage Vuo, which as a positive value, by the detection value Icu and the W-phase system power Pw resulting from multiplication of the voltage Vwo, which has a negative value, by the detection value Icw have positive values. Consequently, if the U-phase system power Pu or the W-phase system power Pw has a negative value, it is determined that the current sensor corresponding to the power system having a negative value exhibits the mounting error. The control unit 13 is capable of easily detecting the mounting error of each of the first current sensor 21 and the second current sensor 22 based on the U-phase system power Pu and the W-phase system power Pw during the non-operation of the inverter unit 12 in the above manner.

(4) The control unit 13 supplies the error signal indicating the mounting error of the second current sensor 22 to the display unit 3 if the U-phase system power Pu is greater than or equal to zero and the W-phase system power Pw is less than zero during the non-operation of the inverter unit 12. The control unit 13 supplies the error signal indicating the mounting error of the first current sensor 21 to the display unit 3 if the U-phase system power Pu is less than zero and the W-phase system power Pw is greater than or equal to zero during the non-operation of the inverter unit 12. The control unit 13 is capable of easily detecting the mounting error of either of the first current sensor 21 and the second current sensor 22 based on the fact that the U-phase system power Pu is different from the W-phase system power Pw using zero as the threshold value during the non-operation of the inverter unit 12 in the above manner.

(5) When the first current sensor 21 or the second current sensor 22 is erroneously mounted to the third electric wire 4c, which is a neutral line, the U-phase system power Pu and the W-phase system power Pw may have positive values during the non-operation of the inverter unit 12. In such a case, the control unit 13 does not supply the error signal indicating that the mounting error of each of the current sensors 21 and 22 to the display unit 3 during the non-operation of the inverter unit 12. Accordingly, the control unit 13 detects the mounting error of each of the current sensors 21 and 22 based on comparison between the variation in the output power from the inverter unit 12 and the variations in the U-phase system power Pu and the W-phase system power Pw. The control unit 13 is capable of detecting the mounting error in which the first current sensor 21 or the second current sensor 22 is erroneously mounted to the third electric wire 4c by detecting the mounting error of each of the current sensors 21 and 22 during both the non-operation of the inverter unit 12 and the operation of the inverter unit 12 in the above manner.

Modifications

The description of the above exemplary embodiment is given as examples of the modes of the power conditioner according to the exemplary disclosure and is not intended to limit the modes. The power conditioner according to the exemplary embodiment may be embodied by modifications of the above embodiment described below and a combination of at least two modifications that are consistent with each other.

For example, the determination may be made based on whether the detection values of the current sensors 21 and 22 have positive values or negative values, instead of whether the U-phase system power and the W-phase system power have positive values or negative values, in the mounting error process during the non-operation of the inverter unit 12 in the above embodiment. In other words, in the mounting error process illustrated in FIG. 3, the determination in Step S11 is replaced with determination of whether "the detection value Icu of the first current sensor 21 is less than zero" and the determinations in Step S12 and Step S13 are replaced with determination of whether "the detection value Icw of the second current sensor 22 is less than zero".

In the mounting error process during the non-operation of the inverter unit 12 in the above embodiment, the control unit 13 may determine whether the U-phase system power Pu is less than zero after the control unit 13 determines whether the W-phase system power Pw is less than zero.

In the mounting error process during the non-operation of the inverter unit 12 in the above embodiment, the control unit 13 may determine whether the load power of the first load 6A is greater than the load power of the second load 6B after the control unit 13 determines the first mounting error. If the load power of the first load 6A is less than or equal to the load power of the second load 6B in this determination, it is determined that the mounting error illustrated in FIG. 4B does not occur. In addition, the control unit 13 may determine whether the load power of the second load 6B is greater than the load power of the first load 6A after the control unit 13 determines the second mounting error. If the load power of the second load 6B is less than or equal to the load power of the first load 6A in this determination, it is determined that the mounting error illustrated in FIG. 5B does not occur.

In the mounting error process during the operation of the inverter unit 12 in the above embodiment, if the control unit 13 determines that the first predetermined time period did not elapse (NO in Step S32), in Step S33, the control unit 13 may determine whether the range of variation of the output power from the inverter unit 12 is greater than or equal to the first threshold value. In other words, the control unit 13 may perform the determination in Step S33 during the first predetermined time period, instead of the determination in Step S33 after the first predetermined time period.

In the mounting error process during the operation of the inverter unit 12 in the above embodiment, the control unit 13 may determine whether the range of variation of the U-phase system power Pu with respect to the variation in the output power from the inverter unit 12 is less than the second predetermined value after the control unit 13 determines whether the range of variation of the W-phase system power Pw with respect to the variation in the output power from the inverter unit 12 is less than the second predetermined value.

In Steps S36 to S38 in the mounting error process during the operation of the inverter unit 12 in the above embodiment, the detection value Icu of the first current sensor 21 and the detection value Icw of the second current sensor 22 may be used, instead of the U-phase system power and the W-phase system power. Specifically, when the range of variation of the output power from the inverter unit 12 is greater than or equal to the first threshold value during the first predetermined time period, the control unit 13 supplies the error signal to the display unit 3 if the detection value Icu of the first current sensor 21 is not varied with the variation in the output power from the inverter unit 12 during the second predetermined time period. When the range of variation of the output power from the inverter unit 12 is greater than or equal to the first threshold value during the first predetermined time period, the control unit 13 supplies the error signal to the display unit 3 if the detection value Icw of the second current sensor 22 is not varied with the variation in the output power from the inverter unit 12 during the second predetermined time period.

In the above embodiment, when the electric power is supplied from the power system 5 to each of the loads 6A and 6B during the non-operation of the inverter unit 12 in the state in which the first current sensor 21 and the second current sensor 22 illustrated in FIG. 2 are correctly mounted, the mounting directions may be defined so that the detection value Icu of the first current sensor 21 has a negative value and the detection value Icw of the second current sensor 22 has a positive value. In this case, the current sensor corresponding to the power system having a positive value, among the U-phase system power Pu and the W-phase system power Pw, exhibits the mounting error.

In this case, in the mounting error process during the non-operation of the inverter unit 12, the control unit 13 changes the determination in Step S11 to determination of "whether the U-phase system power is greater than zero" and changes the determinations in Steps S12 and S13 to determination of "whether the W-phase system power is greater than zero".

In addition, in the mounting modes of the current sensors 21 and 22 illustrated in FIG. 8B and FIG. 9B, the U-phase system power Pu and the W-phase system power Pw are less than zero during the operation of the inverter unit 12 and the control unit 13 does not supply the error signal to the display unit 3 because the control unit 13 determines that the current sensors 21 and 22 are correctly mounted.

In the above embodiment, for example, a wind power generation apparatus, a gas power generation apparatus, or a geothermal power generation apparatus may be used as the power generation apparatus, instead of the solar photovoltaic power generation apparatus 2. In this case, the power conditioner 10 includes a conversion unit corresponding to the used power generation apparatus, instead of the PV converter 11, as the conversion unit.

While exemplary embodiments of the present disclosure have been described above, it is to be understood that variations and modifications will be apparent to those skilled in the art without departing from the scope and spirit of the invention. The scope of the invention, therefore, is to be determined solely by the following claims.

What is claimed:

1. A power conditioner that interconnects with a power system that includes a single-phase three-wire system having first, second and third electric wires, the power conditioner comprising:
    a power converter configured to convert power received from a power generation apparatus to direct-current power;
    an inverter configured to convert the direct-current power into alternating-current power that is output to the power system; and
    a control unit configured to generate an error signal that indicates a mounting error of at least one of a first current sensor for detecting a current value of the first electric wire and a second current sensor for detecting a current value of the second electric wire,
    wherein the control unit generates the error signal based on the respective current values detected by the first and second current sensors, and
    wherein, when the direct-current power output from the inverter varies by or more than a first threshold value during a first predetermined time period, the control unit outputs the error signal if at least one of the detected current values detected by the first and second current sensors, respectively, does not vary with a variation of the direct-current power output from the inverter during a second predetermined time period.

2. The power conditioner according to claim 1, wherein the third electric wire of the single-phase three-wire system is a neutral line.

3. The power conditioner according to claim 1, wherein the second predetermined time period is longer than the first predetermined time period.

4. The power conditioner according to claim 1, wherein, during non-operation of the inverter, the control unit is configured to output the error signal based on a measured first system power based on the current value detected by the first current sensor and to output the error signal based on a measured second system power based on the current value detected by the second current sensor.

5. The power conditioner according to claim 4, wherein, during the non-operation of the inverter, the control unit is configured to output the error signal if one of the measured first and second system powers is greater than or equal to zero and the other of the measured first and second system powers is less than zero.

6. The power conditioner according to claim 4, wherein, during the non-operation of the inverter, when the measured first and second system powers are both greater than or equal to zero or are both less than zero and the output from the inverter varies by or more than the first threshold value during the first predetermined time period, the control unit outputs the error signal if at least one of the measured first and second system powers does not vary with the variation of the direct-current power output from the inverter during the second predetermined time.

7. The power conditioner according to claim 1, wherein the control unit is configured to output the error signal if at least one calculated power values based on at least one of the detected current values detected by the first and second current sensors, respectively, varies less than a second threshold during the second predetermined time period.

8. The power conditioner according to claim 7, wherein the second threshold is less than the first threshold.

9. A power conditioner that interconnects with a power system that includes a single-phase three-wire system having first, second and third electric wires, the power conditioner comprising:
a power converter configured to convert power received from a power generation apparatus to direct-current power;
an inverter configured to convert the direct-current power into alternating-current power that is output to the power system; and
a control unit configured to generate at least one mounting error of at least one of a first current sensor for detecting a current value of the first electric wire and a second current sensor for detecting a current value of the second electric wire,
wherein the control unit calculates a first system power based on the current value detected by the first current sensor and a voltage between the first and third electric wires,
wherein the control unit calculates a second system power based on the current value detected by the second current sensor and a voltage between the second and third electric wires,
wherein the control unit generates the at least one mounting error when at least one of the calculated first and second system powers is less than zero, with the generated at least one mounting error indicating at least one of the first and second current sensors is mounted incorrectly to the single-phase three-wire system.

10. The power conditioner according to claim 9, wherein the control unit generates a first mounting error of the at least one mounting error when the calculated first system power is less than zero and the calculated second system power is greater than or equal to zero, with the first mounting error indicating that the first current sensor is mounted incorrectly to the single-phase three-wire system.

11. The power conditioner according to claim 9, wherein the control unit generates a second mounting error of the at least one mounting error when the calculated first system power is greater than or equal to zero and the calculated second system power is less than to zero, with the second mounting error indicating that the second current sensor is mounted incorrectly to the single-phase three-wire system.

12. The power conditioner according to claim 9, wherein the control unit generates a third mounting error of the at least one mounting error when both the calculated first and second system powers are less than zero, with the third mounting error indicating that the first and second current sensors are mounted incorrectly to the single-phase three-wire system.

13. A method for detecting a mounting of first and second current sensors for a power conditioner interconnected with a power system that includes a single-phase three-wire system having first, second and third electric wires, the method comprising:
converting, by a power converter, power received from a power generation apparatus to direct-current power;
converting, by an inverter, the direct-current power into alternating-current power that is output to the power system;
generating, by a control unit, an error signal that indicates a mounting error of at least one of the first current sensor for detecting a current value of the first electric wire and the second current sensor for detecting a current value of the second electric wire;
generating, by the control unit, the error signal based on respective power values calculated from the current values detected by the first and second current sensors; and
when the direct-current power output from the inverter varies by or more than a first threshold value during a first predetermined time period, outputting, by the control unit, the error signal if at least one of the calculated power values does not vary with a variation of the direct-current power output from the inverter during a second predetermined time period.

14. The method according to claim 13, wherein the third electric wire of the single-phase three-wire system is a neutral line.

15. The method according to claim 13, wherein the second predetermined time period is longer than the first predetermined time period.

16. The method according to claim 13, further comprising, during non-operation of the inverter, outputting, by the control unit, the error signal based on a measured first system power based on the current value detected by the first current sensor and to output the error signal based on a measured second system power based on the current value detected by the second current sensor.

17. The method according to claim 16, further comprising, during the non-operation of the inverter, outputting, by the control unit, the error signal if one of the measured first and second system powers is greater than or equal to zero and the other of the measured first and second system powers is less than zero.

18. The power conditioner according to claim 16, further comprising, during the non-operation of the inverter, when the measured first and second system powers are both greater than or equal to zero or are both less than zero and the output from the inverter varies by or more than the first threshold value during the first predetermined time period, outputting, by the control unit, the error signal if at least one of the measured first and second system powers does not vary with the variation of the direct-current power output from the inverter during the second predetermined time.

19. The method according to claim 13, further comprising outputting, by the control unit, the error signal if the at least one of the calculated power values varies less than a second threshold during the second predetermined time period.

20. The method according to claim 19, wherein the second threshold is less than the first threshold.

* * * * *